Patented July 16, 1940

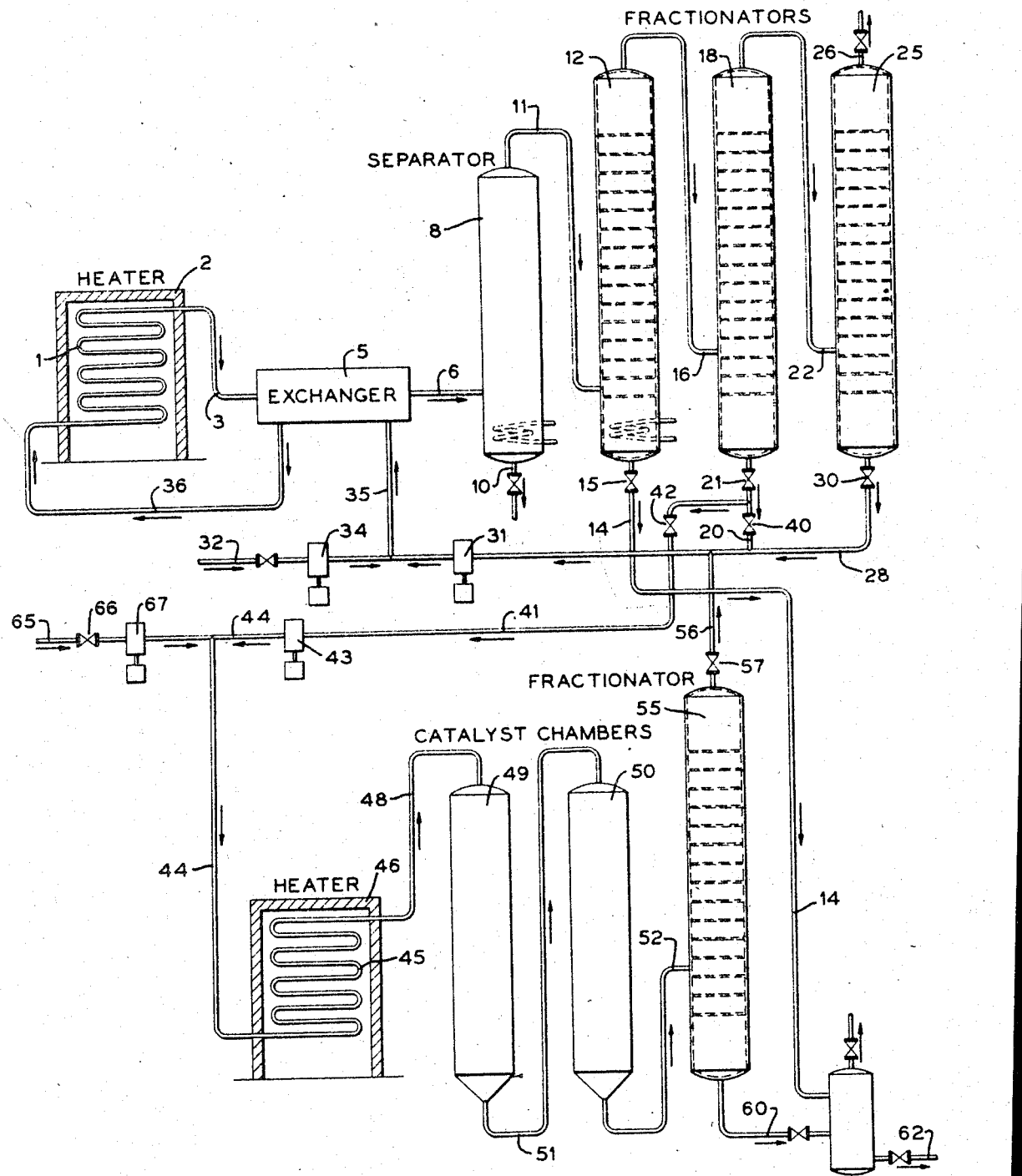

2,208,100

UNITED STATES PATENT OFFICE 2,208,100

POLYMERIZATION OF HYDROCARBON GASES

Theodore A. Mangelsdorf and du Bois Eastman, Port Arthur, Tex., assignors to The Texas Company, New York, N. Y., a corporation of Delaware Application December 8, 1936, Serial No. 114,758

1 Claim. (Cl. 196—10)

This invention relates to the polymerization of hydrocarbon gases and has to do particularly with a combined thermal and catalytic polymerization process for the conversion of normally gaseous hydrocarbons into normally liquid hydrocarbons.

The invention contemplates the polymerization of hydrocarbon gases to form a substantial amount of normally liquid hydrocarbons, the separation from the reaction products of a normally liquid polymer deficient in the more volatile hydrocarbons present in the lower boiling ends of gasoline, also separating from the reaction products an unsaturated gaseous fraction, the subjection of this latter gaseous fraction to catalytic polymerization to form a polymer product containing lower boiling ends of gasoline in sufficient amount to meet the requirements in said lower boiling ends of gasoline of both polymer products.

In the thermal polymerization of hydrocarbon gases, there are formed in addition to a normally liquid hydrocarbon polymer, a gaseous fraction containing unreacted hydrocarbons and gaseous reaction products containing a substantial amount of olefins. In the normal operation of a thermal polymerization process, usually the hydrocarbon gases containing from 2 to 4 carbon atoms are recycled to the polymerization system. It is often undesirable to recycle a portion of these gases, particularly those of 4 carbon atoms containing butane and butenes, because the saturated $C_4$ hydrocarbons are desirable for use as the lower boiling ends of gasoline to produce the desired volatility of the finished product, and also the unsaturated $C_4$ hydrocarbons degrade under the influence of high temperature of the thermal polymerization operation. It is an object of the present invention to provide a more advantageous method for the utilization of a portion of the residual gases of the polymerization operation, particularly the butanes and butenes.

In accordance with the present invention, a hydrocarbon fraction, preferably one predominating in $C_4$ hydrocarbons, is separated from the reaction products of a thermal polymerization process and this fraction processed separately in a catalytic polymerization operation. In the catalytic polymerization operation the unsaturated hydrocarbons, such as the butylenes, are subjected to catalytic polymerization whereby larger yields of liquid polymer are obtained than would be produced by thermal polymerization, and a polymer product separated from the catalytic polymerization operation containing normally liquid hydrocarbons resulting from the polymerization of the olefins in addition to the residual saturated $C_4$ hydrocarbons. It is a further object of the invention that the polymer from the catalytic polymerization operation contain volatile hydrocarbons or lighter ends of gasoline, such as butane, in sufficient amount to meet the requirements in these light ends of both the thermal and catalytic polymer, whereby these two polymer products may be blended to form a naphtha containing an amount of lower boiling or more volatile hydrocarbons, such as butane, suitable for the manufacture of commercial motor fuel.

More particularly, according to the process of the invention, normally gaseous hydrocarbons are subjected to polymerizing conditions of temperature and pressure whereby a substantial amount of normally liquid hydrocarbons is formed. A liquid hydrocarbon polymer is separated from the reaction products, and it is preferable that this polymer be substantially free from hydrocarbons containing less than 5 carbon atoms. The remaining reaction products, after the separation of the liquid polymer, are fractionated to separate a fraction suitable for catalytic polymerization. Such fraction is preferably one predominating in hydrocarbons of 4 carbon atoms, although a smaller amount of lighter or heavier materials may be present, such as minor proportions of propane and propylene. The residual hydrocarbon gases, after the separation of a fraction intended for catalytic polymerization, are further fractionated to separate a fraction suitable for recycling to the system. This recycle stock usually predominates in $C_3$ hydrocarbons and may comprise any or all of the hydrocarbons between 1 and 4 carbon atoms as well as a portion of the $C_4$ hydrocarbons not used for the catalytic polymerization operation. The residual gas, consisting chiefly of methane and hydrogen, is released from the system.

The $C_4$ fraction subjected to catalytic polymerization, consists essentially of a mixture of saturated and unsaturated hydrocarbons, such as butane and butenes. The unsaturated hydrocarbons are intended to be polymerized to normally liquid hydrocarbons while the saturated $C_4$ hydrocarbons will pass through the system unchanged. It is difficult to make a separation between $C_4$ hydrocarbons; consequently no attempt is ordinarily made to regulate by fractionation the proportions of saturated and unsaturated components of the $C_4$ fraction from the thermal polymerization reaction products. Consequently, these proportions will depend mainly on the conditions maintained in the thermal polymerization operation. Since the catalytic polymer will necessarily contain substantial amounts of saturated $C_4$ hydrocarbons, depending on the proportion of these constituents in the feed stock charged to the catalytic polymerization operation, the resultant catalytic polymer will ordinarily contain an excess of more volatile constituents, or saturated $C_4$ hydrocarbons, such as butane. The catalytic polymer, therefore, is ordinarily used as blending stock and it is desirable that this blending stock be blended with a product deficient in lighter ends of gasoline which may be supplied by the $C_4$ hydrocarbons of the catalytic polymer blending agent.

According to one method of operation, it is intended that the catalytic polymer be blended with the polymer produced in the thermal polymerization step. In this way the light constituents in the catalytic polymer will supply the requirements of low boiling constituents for the thermal polymer. In such an operation, in order to maintain the light constituents in the catalytic polymer in the right proportion to meet the requiremens of both the catalytic and thermal polymer when the two are blended, the amount of $C_4$ fraction, derived from the thermal polymerization reaction and which is charged to the catalytic polymerization operation, may be regulated to insure the correct amount of residual $C_4$ saturated hydrocarbons in the catalytic polymer.

The invention will be more fully understood from the following description, read in connection with the accompanying drawing, which shows diagrammatically an elevation of one form of apparatus for carrying out the process of the invention.

Referring to the drawing, hydrocarbon gas, such as natural or refinery gases or a fraction thereof, preferably a fraction predominating in butane or butane and propane, is subjected to polymerizing conditions of temperature and pressure in a heating coil 1, located in a furnace 2. In this coil, the gases are raised to a conversion temperature which may range between 900–1100° F., preferably about 1000–1050° F. under a pressure between 500–5000 pounds and preferably around 750–1500 pounds, for sufficient time, which may range between 1–3 minutes, and preferably around one minute to one minute and a half, whereby a substantial amount of normally liquid hydrocarbons essentially aliphatic in character is formed. While only a heating coil is shown, it is contemplated that a coil and reaction drum may be used. The reaction products are conducted from the heating coil 1, through the line 3 to a heat exchanger 5 wherein the hot products of reaction pass in indirect heat exchange with the charge gases introduced into the heating coil 1. In this heat exchanger, the temperature of the hot reaction products is reduced to about 450–750° F. and preferably around 500–600° F. The partially cooled reaction products are then transferred through the line 6 to a separator 8. In the separator or still 8, products of higher boiling point than the desired polymer naphtha, such as tars, etc., are separated and withdrawn from the bottom of the separator through the valve controlled line 10. The remaining reaction products are conducted from the top of the separator through the line 11 to the fractionator 12. In this fractionator a polymer product is separated consisting of normally liquid products which are withdrawn from the bottom of the fractionator through the line 14 controlled by the valve 15. This polymer is suitable for the manufacture of gasoline but is ordinarily deficient in the more volatile constituents or light ends commonly occurring in commercial gasoline. The fractionation in the tower 12 is intended to be conducted so that the polymer contains substantially no hydrocarbons of a less number of carbon atoms than 5 or, in other words, substantially free from $C_4$ hydrocarbons, such as butane and butenes and lighter materials. The gaseous reaction products substantially free from the normally liquid hydrocarbons are withdrawn from the top of fractionator 12 and conducted through the line 16 to a fractionator 18. In the latter fractionator it is intended to separate a gaseous hydrocarbon fraction containing unsaturated hydrocarbons or olefins suitable for polymerization in a catalytic polymerization operation. Such a fraction may comprise $C_3$ and $C_4$ hydrocarbons and preferably saturated and unsaturated $C_4$ hydrocarbons such as butane and butenes. This hydrocarbon fraction is withdrawn from the bottom of the fractionator 18 through the line 20 controlled by valve 21, for further treatment, as will be described hereinafter. The remaining gaseous hydrocarbons, after the separation of a fraction suitable for catalytic polymerization, are conducted from the top of fractionator 18 through the line 22 and introduced into fractionator 25. In the latter fractionator a gaseous hydrocarbon fraction suitable for recycling to the system, is separated from residual gases, such as hydrogen and methane, which are released from the top of the fractionator 25 through the valve controlled line 26. The recycle stock separated in the fractionator 25, ordinarily comprises $C_3$ hydrocarbons, and a portion or all of the $C_2$ hydrocarbons, as well as a minor proportion of $C_4$ hydrocarbons, depending on how efficiently the $C_4$ hydrocarbons are fractionated out in the fractionator 18. This recycle stock is withdrawn from the bottom of the fractionator 25 through the line 28, controlled by valve 30, by means of a pump 31. This recycle stock is combined with a fresh charging stock withdrawn from a suitable source of supply, not shown, through the line 32 by the pump 34. The mixture of recycle stock and fresh charge is forced through the line 35 to heat exchanger 5 wherein it passes in indirect heat exchange with the hot products of reaction, as mentioned heretofore. In the heat exchanger the charging stock and recycle stock are preheated to a temperature of 200–600° F. and usually around 400–500° F. The preheated mixture is then conducted through the line 36 to the heating coil 1 wherein it is subjected to thermal polymerization.

Referring again to the hydrocarbon fraction withdrawn from the bottom of the fractionator 18, for the purpose of catalytic polymerization, all or a portion of this fraction may be subjected to catalytic polymerization and the remainder, if any, recycled to the thermal polymerization. The portion of the fraction intended for recycling may be introduced into the recycle line 28 by suitable regulation of the valve 40 in the line 20. The gases intended for catalytic polymerization are withdrawn through the branch line 41 controlled by valve 42 and forced by pump 43 through the line 44 to a heating coil 45 located in a furnace 46. In the heating coil 45 the gases are heated to a temperature suitable for polymerization when contacted with a suitable catalyst. This temperature will range between 400–600° F., preferably around 450–500° F. The hot gases are conducted through the line 48 to a series of catalyst chambers 49 and 50, connected by the line 51. While two catalyst chambers are shown, any number may be used, connected in series or parallel, whereby they may be used continuously or intermittently. The catalyst chambers are provided with a suitable catalyst, such as aluminum chloride, sulfuric acid, phosphoric acid, etc. It is preferable to use phosphoric acid, supported on a suitable carrier such as silica gel, bauxite, etc. The gases are intimately contacted with the catalyst and the olefins polymerized to normally liquid hydrocarbons. The reaction products are conducted through the line 52 to a fractionator 55 wherein the desired polymer product is separated from any undesirable gaseous products which are withdrawn from the top of fractionator 55 through the line 56, controlled by the valve 57. These products removed from the top of the tower may consist of $C_3$ hydrocarbons which have been incompletely separated from the charging stock in the polymerization operation and excess $C_4$ hydrocarbons which may be undesirable for retention in the liquid polymer. These gases are ordinarily not great in volume and are conducted through the line 56 which communicates with the recycle line 28 whereby they may be recycled in conjunction with the recycle stock from the thermal polymerization operation to the thermal polymerizing step. The polymer product separated in the fractionator 55 is withdrawn from the bottom of this fractionator through the line 60 and conducted to a run-down tank 61 which is provided with a valved draw-off line 62.

The polymer product from the catalytic polymerization operation, accumulated in the tank 61, contains saturated $C_4$ hydrocarbons, such as butanes, which were unaffected by the catalyst in the catalytic polymerization operation. Ordinarily the amount of these $C_4$ saturated hydrocarbons is considerably in excess of that required to render the catalytic polymer product suitable for motor fuel manufacture. This is intentional and advantageous because it is difficult to separate saturated from unsaturated hydrocarbons of the same number of carbon atoms and accordingly the charging stock to the catalytic polymerization, which ordinarily consists essentially of $C_4$ hydrocarbons, will contain both saturated and unsaturated $C_4$ hydrocarbons, the proportions of which will depend on the nature of the reaction products from the thermal polymerization operation. It is intended to charge as large a portion as possible of the $C_4$ fraction separated from the reaction products of the thermal polymerization operation to the catalytic polymerization operation. It is desirable therefore, if possible, to charge all the $C_4$ fraction removed from the fractionator 18 to the polymerization operation, and the amount of this material charged to the catalytic polymerization operation will ordinarily be limited only by the amount of the saturated $C_4$ hydrocarbons which it is desirable to pass through the catalytic polymerization step. According to the present invention, it is intended that sufficient of this $C_4$ fraction be charged to the catalytic polymerization operation to form a catalytic polymer product which will contain saturated $C_4$ hydrocarbons in sufficient amount to meet the requirement of low volatility constituents of both the thermal and catalytic polymer. Accordingly the catalytic polymer collected in the tank 61 should contain light constituents such as butane in sufficient amount to satisfy the thermal polymer when blended therewith the thermal polymer may be conducted through the line 14 to the run-down tank 61 and mixed with the catalytic polymer to form a blend containing the correct proportion of light constituents for the manufacture of motor fuel. Ordinarily the amount of light constituents such as butane in the blend will correspond to that which is ordinarily present in commercial gasolines.

The catalytic polymerization operation need not necessarily be dependent for a source of charging stock, entirely upon the fraction separated from the thermal polymerization operation. In case the catalytic unit has capacity sufficient to treat extraneous gases or is a catalytic unit ordinarily operating on another charging stock, such as cracked or refinery gases, which may be introduced through the charge line 65, controlled by valve 66, by means of a pump 67, this charging stock may constitute a minor or major proportion of the total feed for the catalytic unit. However, the effect and purpose of the charging stock derived from the thermal polymerization unit will not be defeated and the benefits obtained by the use of this charging stock, according to the present invention, may still be realized.

As an example of the operation of the invention, a gaseous charging stock, consisting of about 70% butane and 30% propane, was subjected to thermal polymerization at a temperature of about 1030° F. under a pressure of approximately 2000 pounds with a reaction time of about 90 seconds. The reaction products are conducted through a transfer line heat exchanger where they pass in indirect heat exchange with the fresh charge and recycle stock and thereby reduced in temperature to about 700° F. The partially cooled products are introduced into a separator wherein higher boiling constituents, such as tars, etc., are separated, and the remaining reaction products subjected to fractionation to separate a liquid polymer and gaseous cuts consisting largely of $C_4$ and $C_3$ hydrocarbons respectively. The $C_3$ cut is recycled to the system and the $C_4$ cut subjected to catalytic polymerization under a pressure of about 100 pounds at a temperature of about 500° F. in the presence of a phosphoric acid catalyst. The catalytic polymer product is separated and the thermal polymer is then blended with the catalytic polymer, the ratio of the volumes of the two being about 3:1 and to form a final product containing approximately the correct amount of light constituents, such as butane, for motor fuel purposes.

The present invention has the advantage of avoiding the return of residual saturated $C_4$ hydrocarbons to the thermal unit thereby eliminating considerable pumping and the recycling of excess products through the system. Furthermore, the recycling of the unsaturated $C_4$ hydrocarbons which will be degraded in the thermal polymerization operation, is largely eliminated. At the same time a catalytic polymer product is obtained in which the saturated $C_4$ hydrocarbons are recovered and a resulting catalytic polymer product obtained which is desirable for blending with another naphtha deficient in high boiling hydrocarbons, such as the thermal polymer. The present invention may also advantageously be operated in connection with a catalytic polymerization operation in which an extraneous unsaturated hydrocarbon gas, such as refinery gases, is being processed, and the butane content of the total catalytic product regulated, as desired.

Obviously many modifications and variations of the invention, as hereinbefore set forth, may be made without departing from the spirit and scope thereof, and therefore only such limitations should be imposed as are indicated in the appended claim.

We claim:

A process for the manufacture of normally liquid gasoline hydrocarbons from normally gaseous hydrocarbons which comprises subjecting a normally gaseous fraction predominating in hydrocarbons of between two and five carbon atoms to polymerizing conditions of temperature of about 900° to 1100° F., and pressure of about 500 to 5000 pounds, whereby normally liquid hydrocarbons are formed, separating from the reaction products a primary normally liquid polymer substantially free from hydrocarbons of less than five carbon atoms, also separating from the reaction products a heavy gaseous fraction predominating in butane and butenes and a light gaseous fraction predominating in hydrocarbons between one and four carbon atoms, recycling said light gasous fraction to the aforesaid polymerization operation, subjecting said heavy gaseous fraction to catalytic polymerization whereby the butenes are polymerized to normally liquid products, separating from the products of the catalytic polymerization operation a secondary normally liquid polymer, retaining in said secondary polymer sufficient butane to meet the volatility requirements of both the polymers, recycling the excess butane to the thermal polymerization operation, and blending the polymers.

THEODORE A. MANGELSDORF.
DuBOIS EASTMAN.